April 19, 1955 — E. A. DUNN — 2,706,463
PRESSURE INDICATOR DEVICE
Filed Aug. 27, 1952
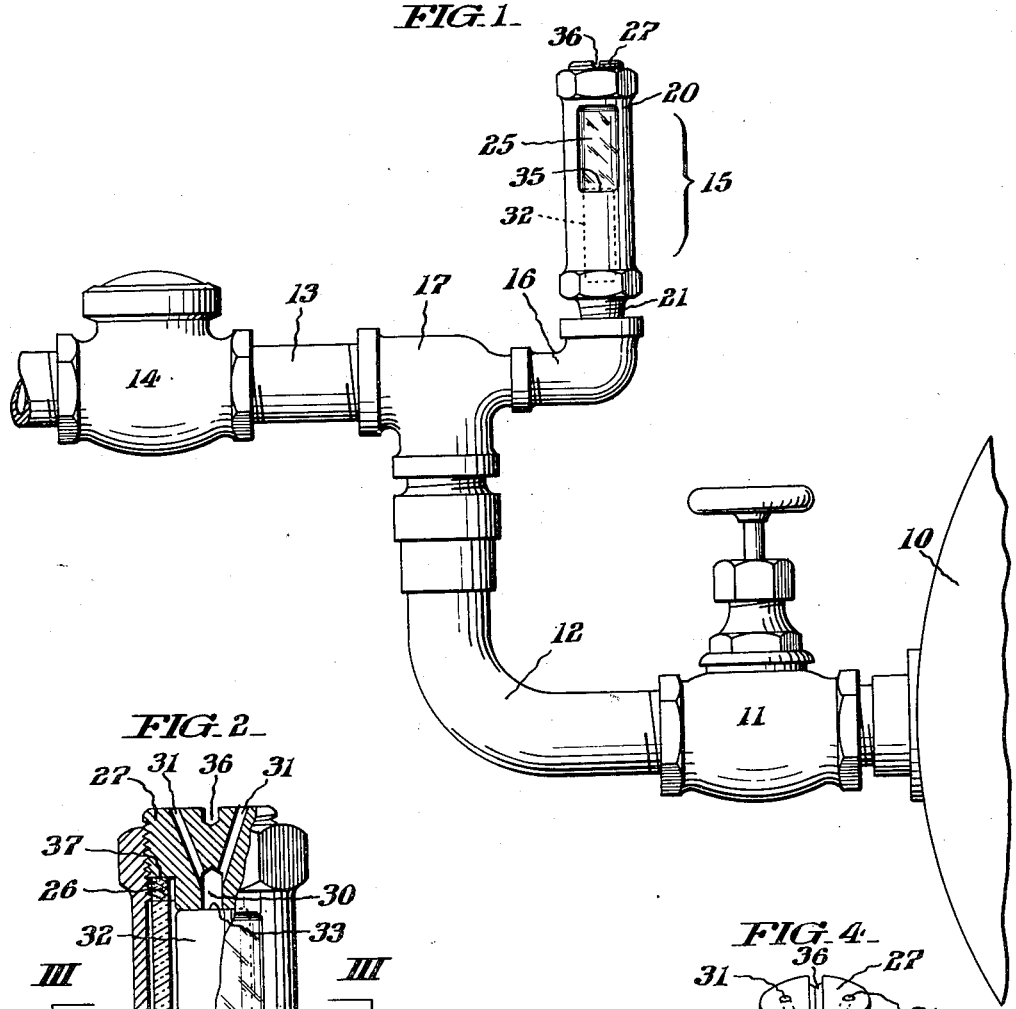
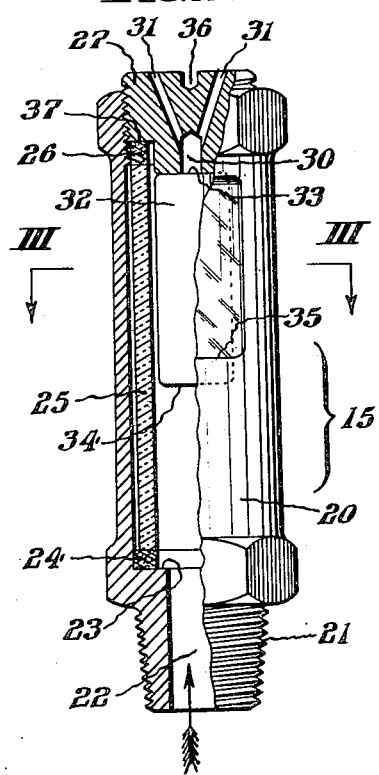
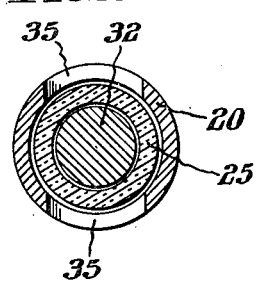
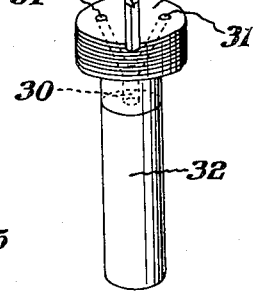
INVENTOR.
Edgar A. Dunn,
BY Paul & Paul
ATTORNEYS.

2,706,463

PRESSURE INDICATOR DEVICE

Edgar A. Dunn, Worthington, Ohio

Application August 27, 1952, Serial No. 306,630

3 Claims. (Cl. 116—70)

This invention relates to a pressure indicator device and more particularly to a warning indicator for use in fluid pressure systems. More specifically this invention is applicable to systems such as fire protection systems wherein a fluid such as carbon dioxide is stored under pressure and distributed when needed through a fluid discharge system. Fire protection equipment of this character is widely used and has specific use in railroad equipment such as diesel electric locomotives for example.

In systems of this kind the fluid discharge pipes are normally under no pressure and the carbon dioxide is maintained under pressure in one or more separate tanks or cylinders sealed from the discharge pipes. However for various reasons the carbon dioxide is sometimes caused to flow through the discharge system and the carbon dioxide reserve in the storage tank is accordingly depleted. In many such systems in use today, no means are provided for indicating whether or not the carbon dioxide supply has been depleted, and it is conventional practice to have the storage tanks or cylinders weighed at certain specified inspection periods. However in practice there have been instances where cylinders have been discharged without this fact being known.

It is accordingly an object of this invention to provide a warning indicator for a system of this type which gives a visible indication when the carbon dioxide supply has been wholly or partially removed from the cylinders. It is another object to provide a strong compact and inexpensive warning indicator which gives a warning indication whenever fluid under pressure is present in the fluid discharge system. Other objects and advantages of the invention, including the simplicity and economy of the same, and the ease with which it may be mounted in a very confined space, will further become apparent hereinafter and in the drawings whereof.

Fig. 1 represents a fragmentary side elevation showing a portion of a carbon dioxide fire protection system provided with an indicator embodying features of this invention;

Fig. 2 represents an enlarged side view of the indicator shown in Fig. 1, a portion being broken away and shown in section in order to reveal important details;

Fig. 3 represents a sectional view through the indicator device, taken as indicated by the lines and arrows III—III which appear in Fig. 2; and Fig. 4 represents a view in perspective showing certain parts of the indicator device.

Referring now in specific detail to the apparatus selected for illustration in the drawings, the pressure discharge system includes a carbon dioxide storage tank 10 which is connected through a valve 11 and pipe 12 into a carbon dioxide discharge pipe 13. The discharge system also includes a check valve 14 through which the carbon dioxide flows when the discharge system is in operation. An indicator 15 is connected to the discharge pipe 13 through suitable pipe fittings 16 and 17.

Turning now to Figs. 2 and 3 of the drawings, the indicator 15 includes an outer cage member 20 having a threaded lower end 21 provided with a bore 22 comprising an inlet opening. Internally formed above the inlet opening is a shoulder 23 on which a gasket 24 is fitted. A transparent tube 25, such as a water gauge glass, for example, is mounted coaxially in the cage 20 with its lower end abutting the gasket 24. An upper gasket 26 is seated on top of the upper end of tube 25. The upper end of the cage 20 has a bore that is coaxial with the bore 22 and forms an outlet opening into which a plug 27 is threaded. The plug 27 has a central vent bore 30 and two upwardly outwardly inclined vent passages 31. Plug 27 contains a metal that is subject to magnetic attraction, such as iron or steel, for example. The lower face of plug 27 is ground smooth.

A magnetized indicator rod 32 is disposed inside the tube 25. The rod 32 has a set of bare, smooth ground upper and lower ends 33, 34. The normal position of magnetic indicator rod 32 is at the bottom of cage 20, resting by gravity upon the shoulder 23 which is preferably made of non-magnetic material. The rod 32 has a cross sectional shape conforming substantially to the inside surface of tube 25 and has capacity to move upwardly toward the top of tube 25 in response to fluid pressure exerted through the inlet opening 22 in the direction indicated by the arrow in Fig. 2.

Near its upper end the cage 20 has a pair of windows 35 which expose the upper portion of the transparent tube 25. It will be appreciated that because of its limited length the permanently magnetized rod 32, which is preferably marked with some distinctive marking such as a bright red enamel coating, is not visible through the windows 35 when its lower face 34 is seated on the shoulder 23. However when the rod 32 moves upwardly to the position indicated in Fig. 2 it is clearly visible through the windows 35 and will show red through the glass tube 25 thereby providing a visible warning that a part or all of the carbon dioxide gas has been exhausted from the tank 10 through the discharge system. The rod 32 is a permanent magnet and the plug 27 consists of steel or some other material that is subject to magnetic attraction and will permanently hold the rod 32 in its upper or indicating position until such time as the indicator is intentionally reset.

Operation

It is to be assumed that the valve 11 is normally closed and that the magnetized rod 32 is seated on the shoulder 23. When valve 11 is opened, fluid under pressure reaches the pipe 13 and operates rod 32 in the manner of a piston, driving rod 32 rapidly upwardly toward its indicating position adjacent the windows 35 as shown in Fig. 2. The air above rod 32 escapes through the vent openings 31, 31 as the rod 32 travel upwardly inside the tube 25. The smooth ground upper face 33 of rod 32 coacts with the smooth ground lower face of plug 27 to seal the central vent opening 30, preventing the loss of any fluid by leakage through the space between rod 32 and the inside wall of tube 25. By reason of magnetic attraction the rod 32 is maintained in its indicating position against plug 27 with or without continued fluid pressure in the pipe 13.

The steel plug 27 is provided with a groove 36 whereby it may be turned with respect to the cage 20 and removed therefrom. As indicated in Fig. 4, the rod 32 adheres to the plug 27 by reason of the magnetic attraction between them when the plug 27 is removed from the cage. To reset the indicator device after the tank 10 has been re-filled and sealed from pipe 13 it is only necessary to break apart the rod 32 and the plug 27, replace the rod 32 in its non-indicating position on the lower shoulder 23, and screw the plug 27 into the threaded opening at the top of cage 20. As the plug 27 is turned into the threaded opening its shoulder 37 bears upon the upper gasket 26 and compresses the upper and lower gaskets 26, 24, against the ends of the tube 25 thereby sealing off the tube 25.

While I have shown and described herein one specific form of pressure indicating device, it will be appreciated that the construction and arrangement shown may be varied in many particulars without departing from the scope of the invention. For example, it will be apparent that the indicator rod 32 may have any desired cross sectional shape, provided it conforms substantially to the inside surface of tube 25 and has capacity to move upwardly toward the top of tube 25 in response to fluid pressure exerted through the outlet opening 22, all as heretofore indicated. It will also be apparent that various changes may be made in the form of the indicator and its component elements, including reversals of parts and substitutions of equivalents, all without departing from the spirit and scope of the invention as defined in the annexed claims.

Having thus described my invention, I claim:

1. A pressure sensitive warning indicator for a fluid pressure system comprising an elongate cage having a body portion provided with a sight opening, means for connecting and securing one end of the cage into the system, said cage having an inlet opening communicating with the fluid pressure system, a lower shoulder internally formed in said cage above said inlet opening, a lower gasket on the shoulder, an elongate transparent hollow tube extending upwardly coaxially within said cage adjacent said sight opening, the lower end of said tube being sealed against said gasket, an upper gasket on the upper end of said tube, stop means at the top of the cage, threaded means for connecting said stop means to said cage, said stop means having an upper shoulder arranged to contact the top of said upper gasket, said upper and lower shoulders and said threaded means coacting to compress the upper and lower gaskets against the ends of said transparent tube, an indicator element in the form of a rod slidably mounted and snugly fitted within the tube with capacity to move upwardly inside the tube against said stop means under the influence of pressure in the system, and means for retaining the indicator element adjacent said sight opening after it reaches that position, said stop means including a vent and said rod having a closure portion closing said vent when said rod is against said stop means.

2. A warning indicator for a fluid pressure system comprising a cage having a fluid inlet opening, said cage having a fluid outlet opening and also having a sight opening in its body portion near said fluid outlet opening, means adjacent the inlet opening for connecting the cage into the system with the outlet opening located above the inlet opening, a transparent tube carried in said cage in sealed communication with both said inlet and outlet openings, said transparent tube passing adjacent to the sight opening in said cage, an indicator piston comprising a permanent magnet disposed in said transparent tube normally adjacent to said inlet opening with capacity to move, in response to fluid pressure in the system, from a position adjacent to the inlet opening to a position adjacent to the outlet opening so as to be visible from outside the cage through said sight opening, said piston having a smooth upper face, a metallic plug fixed to the cage across said outlet opening, said plug including a metal that is subject to magnetic attraction and has capacity to retain said piston against the outlet opening without the assistance of any fluid pressure, said plug having a vent opening, and said plug having a smooth face around the vent opening coacting with the smooth upper face of the piston to close the vent opening when said piston and plug are forced together by the fluid pressure in the system.

3. A pressure sensitive warning indicator for a fluid pressure system comprising a hollow upright body having an inlet opening and also having a vent opening above said inlet opening, said body having a transparent portion adjacent said vent opening, means for connecting the inlet opening of said body into said system, indicator means in the form of a metal rod having a snug fit in said transparent body and movable along said transparent body whereby it is movable toward the vent opening by any substantial fluid pressure in the system, said indicator being visible through said transparent body portion when said indicator is adjacent to said vent opening, said indicator having a closure portion closing said vent in response to said fluid pressure, and retainer means carried by said body for retaining said indicator means adjacent to said vent opening after the fluid pressure in the system is relieved, both said indicator and retainer members comprising metal which is subject to magnetic attraction, and one of said members being magnetized.

References Cited in the file of this patent

UNITED STATES PATENTS

| | | |
|---|---|---|
| 2,514,907 | Stewart | July 11, 1950 |
| 2,569,316 | Jerman | Sept. 25, 1951 |
| 2,662,502 | Turner | Dec. 15, 1953 |

FOREIGN PATENTS

| | | |
|---|---|---|
| 553,640 | Great Britain | May 31, 1943 |